(12) United States Patent
Nagase

(10) Patent No.: US 10,346,207 B2
(45) Date of Patent: Jul. 9, 2019

(54) MEMORY ACCESS CONTROLLER, MEMORY ACCESS CONTROL METHOD, AND RECORDING MEDIUM STORED WITH PROGRAM

(71) Applicant: NEC Corporation, Tokyo (JP)

(72) Inventor: Satoru Nagase, Tokyo (JP)

(73) Assignee: NEC Corporation, Tokyo (JP)

(*) Notice: Subject to any disclaimer, the term of this patent is extended or adjusted under 35 U.S.C. 154(b) by 184 days.

(21) Appl. No.: 15/454,398

(22) Filed: Mar. 9, 2017

(65) Prior Publication Data

US 2017/0269969 A1   Sep. 21, 2017

(30) Foreign Application Priority Data

Mar. 18, 2016 (JP) ................ 2016-055680

(51) Int. Cl.
| | |
|---|---|
| *G06F 9/46* | (2006.01) |
| *G06F 9/50* | (2006.01) |
| *G06F 11/30* | (2006.01) |
| *G06F 11/34* | (2006.01) |

(52) U.S. Cl.
CPC ............ *G06F 9/5016* (2013.01); *G06F 9/505* (2013.01); *G06F 9/5083* (2013.01); *G06F 11/3024* (2013.01); *G06F 11/3037* (2013.01); *G06F 11/3433* (2013.01); *G06F 2201/88* (2013.01)

(58) Field of Classification Search
None
See application file for complete search history.

(56) References Cited

FOREIGN PATENT DOCUMENTS

| | | |
|---|---|---|
| JP | H07-295878 A | 11/1995 |
| JP | 2004-110484 A | 4/2004 |
| JP | 2006-172243 A | 6/2006 |
| JP | 2007-094657 A | 4/2007 |
| JP | 2015-069576 A | 4/2015 |

*Primary Examiner* — Gregory A Kessler
(74) *Attorney, Agent, or Firm* — Wilmer Cutler Pickering Hale and Dorr LLP

(57) ABSTRACT

A memory access control device includes: an in-process number calculating unit that calculates an in-process number, which is a number of in-process load requests, at a predetermined time to a memory network; a reply number calculating unit that calculates a number of replies of the load requests received in a predetermined period from the predetermined time; an issuance number limitation unit that calculates an issuance limit value of the load requests in the predetermined period; an update determination unit that decides the issuance limit value regarding a next period on a base of the in-process number, the number of replies, and the issuance limit value in the predetermined period; and a hold determination unit that outputs a hold instruction of the load requests to a request pipeline connected to the memory network when the in-process number is larger than the issuance limit value regarding the next period.

10 Claims, 5 Drawing Sheets

MEMORY ACCESS CONTROLLER, MEMORY ACCESS CONTROL METHOD, AND RECORDING MEDIUM STORED WITH PROGRAM

This application is based upon and claims the benefit of priority from Japanese Patent Application No. 2016-055680, filed on Mar. 18, 2016, the disclosure of which is incorporated herein in its entirety by reference.

TECHNICAL FIELD

The present invention relates to a memory access control device, an information processing system, a memory access control method, and a non-transitory computer readable recording medium storing a program therefore.

BACKGROUND ART

In a technical area of a processor, it is difficult to improve performance by a single core due to problems with respect to a limitation of a clock operation frequency, heat generation and power consumption. Therefore, in recent years, an architecture, in which total performance is exhibited by mounting a plurality of cores in a chip, becomes mainstream.

In a case of a sharing-memory-type processor in which a plurality of cores share a memory, it is necessary to construct a network that connects each core to the memory. However, with an increase in the number of cores, it is difficult to directly connect all cores to the memory due to problems regarding a limitation of the number of transistors which are capable of being mounted in an LSI (Large Scale Integration) chip, and a wiring property. Therefore, it is realistic to indirectly connect the cores to the memory by utilizing topologies which are a mesh, a ring and the like. In this case, distances between the cores and the memory may not be equal, and arbitration (competition arbitration) may occur for competition between a memory request by an own core and a memory request by another core in each point in the network. When load of the network is increased by such a reason, it is determined that a state generally called congestion occurs. When the congestion state has occurred, memory latency increases and replies for memory load commands are out of order. Therefore, system performance degrades considerably. Particularly, in a HPC (High Performance computing) field, since the improvement of memory access performance is one of the most important performance parameters, a technology for avoiding this problem becomes very important.

As a technology related to such a technology, PTL1 (Japanese Unexamined Patent Application Publication No. 2007-094657) discloses a technology related to a memory access control method in which each processor autonomously predicts a memory load in a multiprocessor system. This technology prevents processing from being stopped by a busy signal.

PTL 2 (Japanese Unexamined Patent Application Publication No. 2006-172243) discloses a technology related to a fault-tolerant computer device in which a plurality of computer systems simultaneously perform processing in synchronization with a clock.

PTL 3 (Japanese Unexamined Patent Application Publication No. 2004-110484) discloses a technology related to a memory access device capable of efficiently performing exclusive control.

SUMMARY

In a memory network such as a two-dimensional mesh, in which competition arbitration occurs in a plurality of points, if each core has unconditionally issued a request to the memory network, congestion (confusion) occurs in the memory network. For this reason, there occurs phenomena that latency becomes worse and reverse of a reply order for load requests increases. Furthermore, there is a problem that system performance is down on the ground that the core is not able to obtain data requested by the core and perform arithmetic processing.

In order to avoid the problem, for example, a solution is devised to aggregate statistical information regarding a load status and the like of each core and transfer the statistical information to each core, so that each core limits an issuance of new requests based on the statistical information. However, it is realistically difficult to timely aggregate the statistical information regarding a great number of cores and feedback the statistical information to each core.

In the configuration disclosed in PTL 1, an increase/decrease of the number of memory access issuance to be permitted is controlled on the base of a result obtained by monitoring whether a memory access time exceeds a prescribed threshold value. However, it is difficult to sequentially set a limit value regarding the number of requests to be issued from each core (each processor) to the memory in consideration of latency.

In the configuration disclosed in PTL 2, a write command is limited using a read counter, so that synchronization for operations of both processors is performed. However, in this configuration, the write command is controlled by simply comparing the amounts of a read request and read end with each other, and it is not possible to sequentially optimize a limit value.

In the configuration disclosed in PTL 3, since the memory access device provided in order to monitor a memory access state by a plurality of CPUs (Central Processing Units) aggregates and manages memory access states by all the CPUs, an application object is limited.

Accordingly, in all the technologies disclosed in the aforementioned patent literatures, it is difficult to sequentially set a limit value of the number of requests to be issued from each core to the memory in consideration of latency. Consequently, in these technologies, it is not possible to avoid the probability that the congestion state will occur in the memory network, or memory access performance will not be able to be exhibited by an excessive limitation of memory access.

Therefore, one object of the present invention is to solve the aforementioned problem, that is, is to provide a memory access control device and the like capable of suppressing the occurrence of a congestion state in a memory network and exhibiting sufficient memory access performance.

A memory access control device according to one aspect of the present invention includes: an in-process number calculating unit configured to calculate an in-process number, which is a number of in-process load requests, at a predetermined time with respect to a memory network that connects a processor core to a memory; a reply number calculating unit configured to calculate a number of replies, which is a number of replies of the load requests received within a predetermined period from the predetermined time; an issuance number limitation unit configured to calculate an issuance limit value of the load requests within the predetermined period; an update determination unit configured to decide the issuance limit value regarding a next period on a base of the in-process number, the number of replies, and the issuance limit value within the predetermined period; and a hold determination unit configured to output a hold instruction of the load requests to a request pipeline connected to the memory network when the in-process number is larger than the issuance limit value regarding the next period.

In another point of view of attaining the above-mentioned object, a memory access control method according to another aspect of the present invention includes: calculating an in-process number, which is a number of in-process load requests, at a predetermined time with respect to a memory network that connects a processor core to a memory; calculating a number of replies, which is a number of replies of the load requests received within a predetermined period from the predetermined time; calculating an issuance limit value of the load requests within the predetermined period; deciding the issuance limit value regarding a next period on a base of the in-process number, the number of replies, and the issuance limit value within the predetermined period; and outputting a hold instruction of the load requests to a request pipeline connected to the memory network when the in-process number is larger than the issuance limit value regarding the next period.

In further another point of view of attaining the above-mentioned object, a non-transitory computer readable recording medium storing a program causing a processor core to perform: a process of calculating an in-process number, which is a number of in-process load requests, at a predetermined time with respect to a memory network that connects the processor core to a memory; a process of calculating a number of replies, which is a number of replies of load requests received within a predetermined period from the predetermined time; a process of calculating an issuance limit value of the load requests within the predetermined period; a process of deciding the issuance limit value regarding a next period on a base of the in-process number, the number of replies, and the issuance limit value within the predetermined period; and a process of outputting a hold instruction of the load requests to a request pipeline connected to the memory network when the in-process number is larger than the issuance limit value regarding the next period.

BRIEF DESCRIPTION OF THE DRAWINGS

Exemplary features and advantages of the present invention will become apparent from the following detailed description when taken with the accompanying drawings in which.

EXAMPLE EMBODIMENT

First Example Embodiment

A first example embodiment of the present invention will be described in detail with reference to the drawings.

Figure 1:
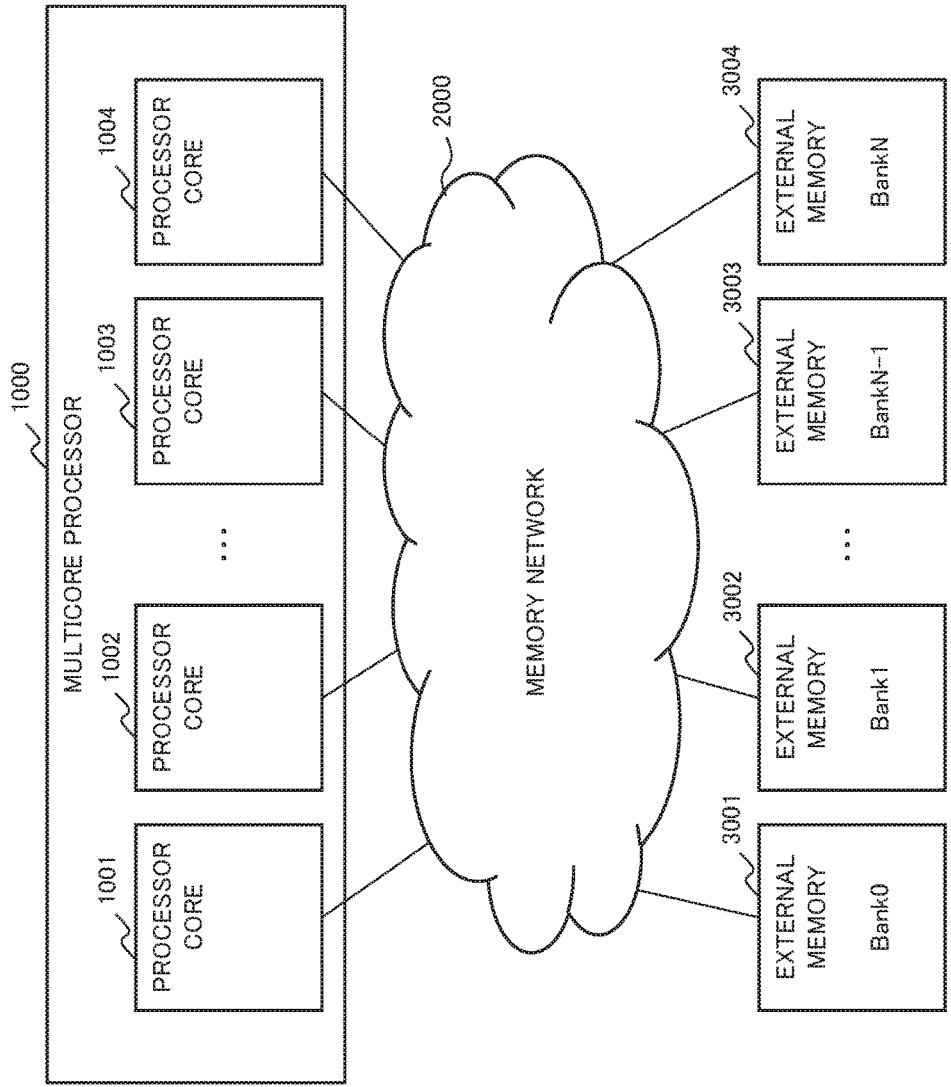
FIG. 1 is a block diagram illustrating an example of a configuration of an information processing system 100 according to a first example embodiment.

FIG. 1 is a block diagram illustrating an example of a configuration of an information processing system 100 according to the first example embodiment.

The information processing system 100 includes a multicore processor 1000, a memory network 2000, and memories (external memories 3001, 3002, 3003, and 3004) interleaved in a plurality of banks.

The multicore processor 1000 includes a plurality of processor cores 1001, 1002, 1003, and 1004. FIG. 1 illustrates an example in which the number of the processor cores 1001 to 1004 is 4 and the number of the external memories 3001 to 3004 is 4; however, the number is not limited to 4 and may be an arbitrary number equal to or more than 2. The processor cores 1001 to 1004 are respectively connected to the external memories 3001 to 3004 via the memory network 2000. In addition, a configuration is also devised to provide caches between the processor cores 1001 to 1004 and the external memories 3001 to 3004; however, in a description of the present example embodiment, the caches are not illustrated because they are not essential.

Figure 2:
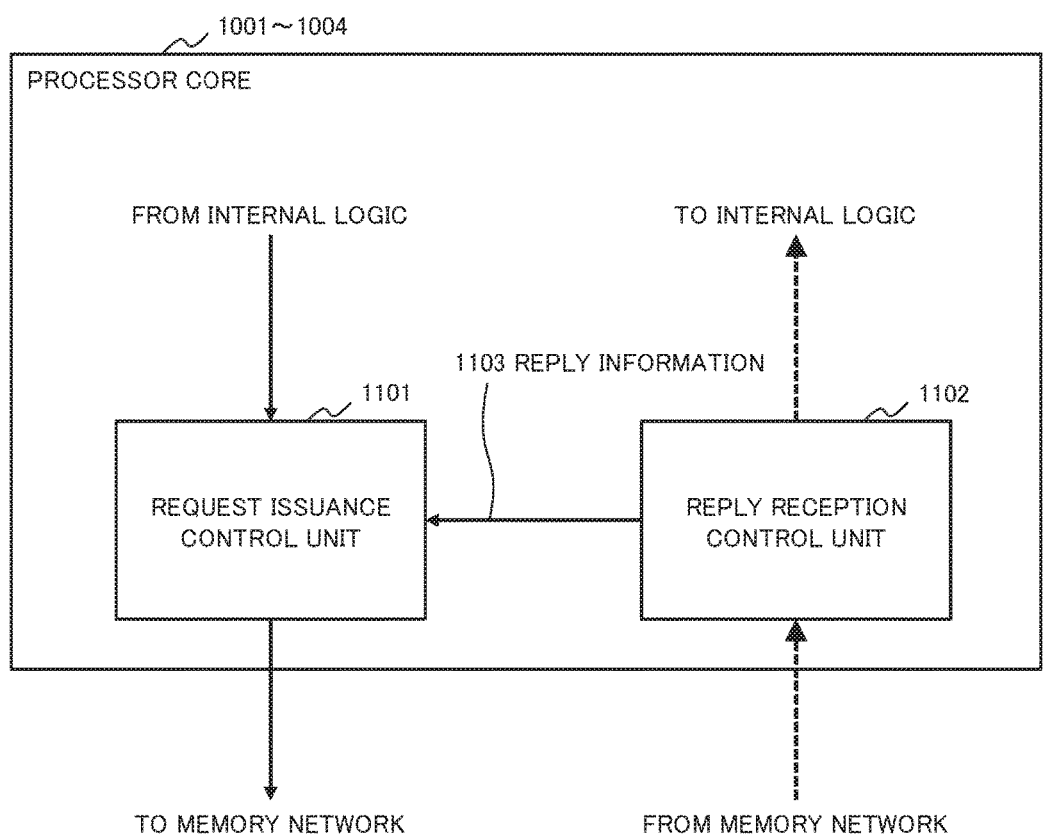
FIG. 2 is a block diagram illustrating an example of a configuration of processor cores 1001 to 1004 according to the first example embodiment.

FIG. 2 is a block diagram illustrating an example of the configuration of the processor cores 1001 to 1004. Arrows in the block diagram are an example and do not limit directions of all signals and data between elements.

Each of the processor cores 1001 to 1004 has a request issuance control unit 1101 and a reply reception control unit 1102 therein.

In the following description, there is a case in which each of the processor cores 1001 to 1004 is simply called a core. Furthermore, there is a case in which each of the external memories 3001 to 3004 is simply called a memory.

The request issuance control unit 1101 has a function of receiving a memory load/store request from an interior (an internal logic) of the core and issuing a load/store request packet toward the memory network 2000.

Furthermore, the reply reception control unit 1102 receives a load reply packet from the memory network 2000. The load reply packet includes data representing a reply from the memory for the load request packet including a load request. Furthermore, the reply reception control unit 1102 transmits data, which is a reply to the interior of the core. Moreover, in order to perform functions of the present example embodiment, the reply reception control unit 1102 outputs reply information 1103 for notifying the request issuance control unit 1101 of the reception of the reply.

A congestion state in the memory network 2000 occurs due to an increase in the number of requests stayed in a network. Accordingly, the number of requests to be issued from the core to the memory is limited, so that it is possible to solve the congestion state. When the limitation is excessive, since memory access performance is not able to be exhibited, it is important to appropriately give a limitation.

In the information processing system 100 according to the present example embodiment, the number of replies returned after the passage of a prescribed time is observed for the number of in-process load requests issued to the memory network 2000 from a certain processor core (for example, the processor core 1001) at a certain time. Then, the information processing system 100 changes a limit value in response to the number of returned replies. When the number of returned replies is smaller than the number of in-process requests (the in-process number of requests), the request issuance control unit 1101 determines that the memory network 2000 is congested and decides an issuance limit value for limiting the number of next requests. On the other hand, when the number of returned replies is larger than the number of in-process requests, the request issuance control unit 1101 determines that it is possible to relax a limitation because the memory network is empty and decides a next issuance limit value for relaxing the number of requests. The prescribed time, for example, is a value set to an appropriate value in consideration of ideal latency of memory access.

In the present example embodiment, the request issuance control unit 1101, which controls the issuance and reception of memory access in the processor core illustrated in FIG. 2, has a mechanism for performing the aforementioned algorithm. That is, the request issuance control unit 1101 having the mechanism decides an issuance limit value on the base of a relation between the number of replies and the number of requests (illustrated in FIG. 3 to be described later). By so doing, in the present example embodiment, it is possible to achieve optimal issuance limitation on the base of a contradictory condition of congestion avoidance and memory performance retention according to the load status of the memory network 2000 that frequently changes.

Figure 3:
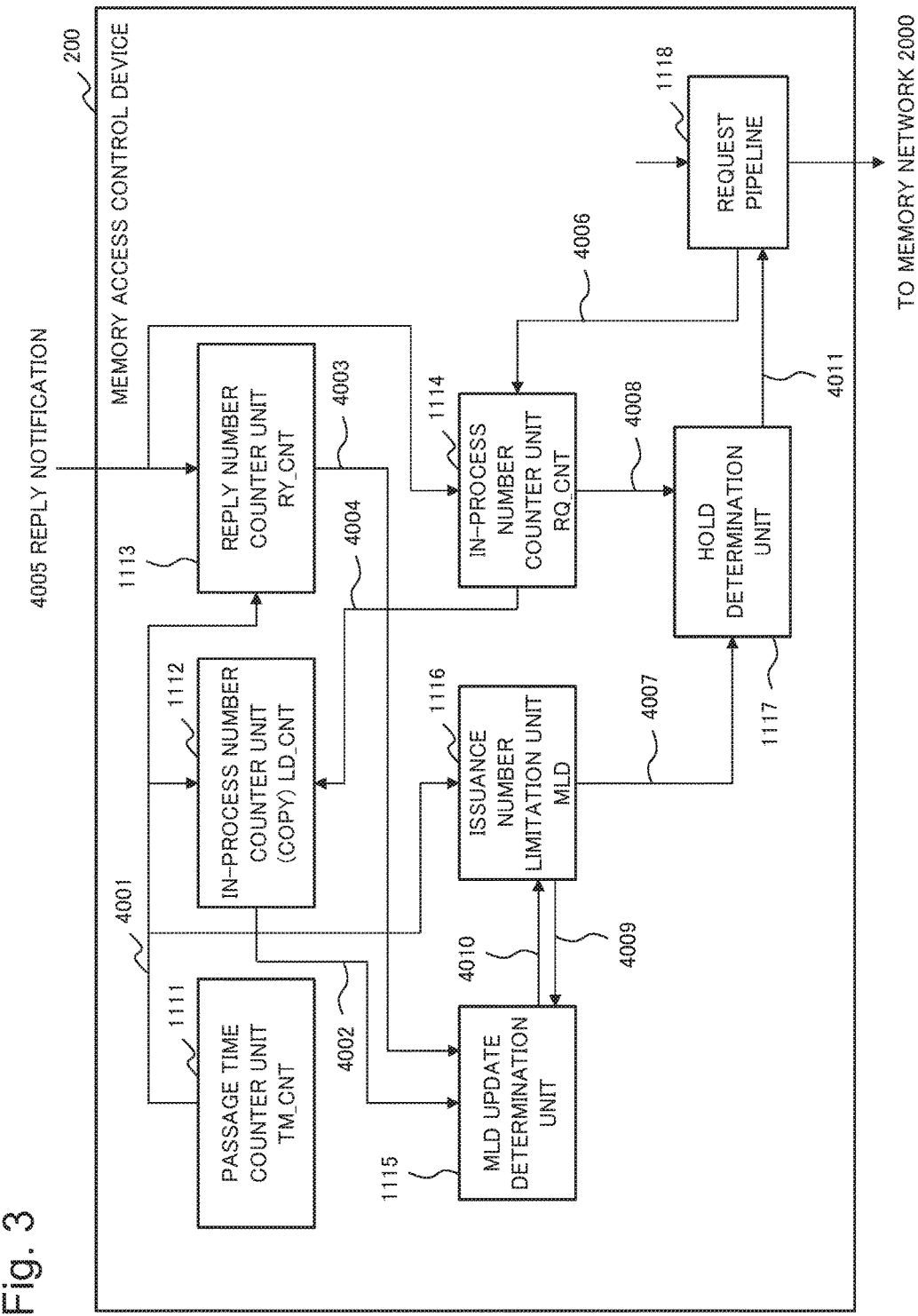
FIG. 3 is a block diagram illustrating an example of a configuration of a memory access control device 200 in which a detailed configuration of a request issuance control unit 1101 is a main configuration according to the first example embodiment.

FIG. 3 is a block diagram illustrating an example of a partial configuration of a memory access control device 200 in which a detailed configuration of the request issuance control unit 1101 is a main configuration. Arrows in the block diagram are an example and do not limit directions of all signals and data between elements.

The memory access control device 200 includes the following elements, that is, a passage time counter unit 1111, an in-process number counter unit 1112, a reply number counter unit 1113, an in-process number counter unit 1114, an MLD (Max LoaD) update determination unit 1115, an issuance number limitation unit 1116, a hold determination unit 1117, and a request pipeline 1118. The request issuance control unit 1101 includes at least the reply number counter unit 1113 and the request pipeline 1118, but may include elements not illustrated in FIG. 3. The MLD indicates an issuance limit value as will be described later.

The following elements, that is, the passage time counter unit 1111, the in-process number counter unit 1112, the reply number counter unit 1113, the in-process number counter unit 1114, the MLD update determination unit 1115, the issuance number limitation unit 1116, the hold determination unit 1117, and the request pipeline 1118, for example, may be configured with a hardware circuit such as a logical circuit.

Furthermore, the following elements, that is, the passage time counter unit 1111, the in-process number counter unit 1112, the reply number counter unit 1113, the in-process number counter unit 1114, the MLD update determination unit 1115, the issuance number limitation unit 1116, the hold determination unit 1117, and the request pipeline 1118 may be functional units implemented by executing a program stored in a memory (not illustrated) by a processor core (a computer) implementing the memory access control device 200.

The passage time counter unit 1111 has a counter for measuring a clock cycle therein. The passage time counter unit 1111 measures a passage time for each clock cycle, and inputs an update instruction 4001 to peripheral related blocks when the measured passage time has reached a setting value set from an exterior. At this time, the passage time counter unit 1111 clears its own counter and starts to measure a passage time again. The passage time counter unit 1111 repeatedly performs such operations. The peripheral related blocks perform their own operations by employing the update instruction 4001 as a trigger. The related blocks are the in-process number counter unit 1112, the reply number counter unit 1113, and the issuance number limitation unit 1116.

The in-process number counter unit 1112 has a flip-flop (not illustrated) for holding the number of load requests being issued to the memory network 2000 at a certain time. When the update instruction 4001 has been received from the passage time counter unit 1111, the in-process number counter unit 1112 copies a value indicate by in-process number information 4004 inputted from the in-process number counter unit 1114 (its details will be described later) at that time point, and continuously holds the value until a next update instruction is reached.

The reply number counter unit 1113 observes the number of load replies reached the reply reception control unit 1102 in a certain prescribed period, and outputs reply number information 4003 indicating a result of the observation. Specifically, when a replay notification 4005 has been received from the reply reception control unit 1102 via an interface for notifying the reply information 1103, the reply number counter unit 1113 counts up a counter provided therein. Furthermore, the reply number counter unit 1113 has a function of clearing its own counter when the update instruction 4001 has been received from the passage time counter unit 1111.

The in-process number counter unit 1114 always counts the number of load requests being processed after being issued to the memory network 2000. When a load request (a load request packet) has been issued from the request pipeline 1118 to be described later, the in-process number counter unit 1114 receives the issuance by a request issuance notification 4006 and increments a value of an internal counter by +1. When the reply notification 4005 has been received, the in-process number counter unit 1114 decrements the value of the internal counter by −1. That is, the value of the counter indicates the in-process number of load requests at each time. The in-process number counter unit 1114 outputs the in-process number to the in-process number counter unit 1112 as the in-process number information 4004. Furthermore, the in-process number counter unit 1114 outputs the in-process number to the hold determination unit 1117 as in-process number information 4008.

The MLD update determination unit 1115 receives various types of information in a current period (a current update timing period) and decides a request issuance limit value in a period up to next update (a next period). The MLD update determination unit 1115 receives in-process number information 4002 to be described later from the in-process number counter unit 1112. The MLD update determination unit 1115 receives the reply number information 4003 from the reply number counter unit 1113. The MLD update determination unit 1115 receives current limit value information 4009 indicating an issuance limit value in the current period from the issuance number limitation unit 1116 to be described later. Based on these types of received information, the MLD update determination unit 1115 decides an issuance limit value in a next period. The MLD update determination unit 1115 inputs the decided issuance limit value to the issuance number limitation unit 1116 as next period limit value information 4010.

The issuance number limitation unit 1116 is a block that holds an issuance limit value in a certain period. When the update instruction 4001 has been received from the passage time counter unit 1111, the issuance number limitation unit 1116 stores the next period limit value information 4010, which is notified from the MLD update determination unit 1115, in an internal flip-flop (not illustrated) of the issuance number limitation unit 1116. The issuance number limitation unit 1116 continuously holds the value (the issuance limit value) stored in the flip-flop until a next update instruction 4001 is reached. The issuance number limitation unit 1116 outputs the held issuance limit value to the hold determination unit 1117 as limit value information 4007.

The hold determination unit 1117 determines whether to issue a load request, which exists in the request pipeline 1118 to be described later, to the memory network 2000 or whether to hold the issuance. Specifically, the hold determination unit 1117 receives the limit value information 4007 notified from the issuance number limitation unit 1116 and the in-process number information 4008 notified from the in-process number counter unit 1114. When a value indicated by the in-process number information 4008 exceeds a value indicated by the limit value information 4007, the hold determination unit 1117 notifies the request pipeline 1118 of a hold instruction 4011.

The blocks described as the configuration of the present example embodiment cooperate with one another, thereby performing entire control expressed by formulas (0) to (6) below.

| | |
|---|---|
| MLD<=number of issuable load requests | Formula (0) |
| LD_CNT[t]<=number of in-process loads at time $t$ | Formula (1) |
| RY_CNT[t+T]<=number of received replies from times $t$ to $t+T$ | Formula (2) |
| IF(LD_CNT[t])>RY_CNT[t+T])MLD<=RY_CNT[t+T] | Formula (3) |
| IF(MLD<RY_CNT[t+T])MLD<=RY_CNT[t+T] | Formula (4) |
| $t<=t+T$ | Formula (5) |
| goto (1) | Formula (6) |

The MLD indicated by Formula (0) and the like is an issuance limit value. The LD_CNT[t] indicated by Formula (1) and the like is an in-process number held in the in-process number counter unit 1112 at a time t. The RY_CNT [t+T] indicated by Formula (2) and the like is the number of replies counted by the reply number counter unit 1113 from times t to t+T. In each Formula, the time [T] is a latency control parameter and is a parameter value optimally set based on a distance (latency) between the cores and the memory. In the aforementioned Formulas (0) to (5), "<=" indicates an arrow. Formulas (0) to (5) indicate that an item of a right side of "<=" is set to an item of a left side of "<=". For example, when a condition (LD_CNT[t]>RY_CNT[t+T]) following IF is satisfied, Formula (3) indicates that the number of replies (RY_CNT[t+T]) is set as the issuance limit value (MLD).

Next, operations of each block illustrated in FIG. 3 will be described.

The passage time counter unit 1111 illustrated in FIG. 3 repeatedly transmits the update instruction 4001 to peripheral blocks and instructs an update timing to theses blocks whenever the time T passes.

The in-process number counter unit 1114 always counts the number of in-process load requests for the memory network 2000. The in-process number counter unit 1114 copies a count value at a certain time (set as "t") of an update timing to the in-process number counter unit 1112. In the in-process number counter unit 1112, the copied value is held until a next update timing at which the time (the period) T has passed. Then, the value is notified to the MLD update determination unit 1115 as the in-process number information 4002.

The reply number counter unit 1113 counts the number of replies inputted to the reply reception control unit 1102 during a period until the time T passes. The reply number counter unit 1113 resets the counted value according to the update instruction 4001 inputted from the passage time counter unit 1111, and then continuously counts the number of replies until a next update instruction 4001 is inputted. That is, the count value after the time T passes from an update timing indicates the number of replies inputted until the time T passes. The reply number counter unit 1113 notifies the MLD update determination unit 1115 of the count value as the reply number information 4003.

The MLD update determination unit 1115 performs evaluation indicated by the aforementioned Formulas (3) and (4) at the time t+T based on the in-process number information 4002 notified from the in-process number counter unit 1112, the reply number information 4003 notified from the reply number counter unit 1113, and the current limit value information 4009 notified from the issuance number limitation unit 1116. That is, the MLD update determination unit 1115 evaluates whether the in-process number is larger than the number of replies (Formula (3)) or whether the number of replies is larger than the issuance limit value (Formula (4)). On the base of a result of the evaluation, the MLD update determination unit 1115 decides an MLD value (an issuance limit value) at a next period T. For example, when the in-process number is larger than the number of replies (Formula (3)), the MLD update determination unit 1115 decides the number of replies as the issuance limit value of the next period. Furthermore, when the number of replies is larger than the issuance limit value (Formula (4)), the MLD update determination unit 1115 decides the number of replies as the issuance limit value of the next period. The MLD update determination unit 1115 notifies the issuance number limitation unit 1116 of the decided issuance limit value as the next period limit value information 4010.

The issuance number limitation unit 1116 updates the notified next period limit value information 4010 at a timing at which the update instruction 4001 inputted from the passage time counter unit 1111 is received, and holds the next period limit value information 4010 up to a timing at which the next update instruction 4001 is notified.

The hold determination unit 1117 receives the limit value information 4007 from the issuance number limitation unit 1116. The hold determination unit 1117 receives the in-process number information 4008 from the in-process number counter unit 1114. The hold determination unit 1117 compares the sizes of the received pieces of information. When a value indicated by the in-process number information 4008 exceeds a value indicated by the limit value information 4007, the hold determination unit 1117 notifies the request pipeline 1118 of the hold instruction 4011 in order to stop further issuance of load requests.

When the hold instruction 4011 is received, the request pipeline 1118 stops the issuance of the load requests to the memory network 2000.

Thereafter, after a certain time passes, the reply notification 4005 indicating the input of a reply to the reply reception control unit 1102 is notified to the in-process number counter unit 1114. The in-process number counter unit 1114 notified of the replay notification 4005 performs subtraction of a counter provided therein, and notifies the hold determination unit 1117 of the subtracted value as the in-process number information 4008.

When the in-process number information 4008 becomes less than the limit value information 4007, the hold determination unit 1117 finally cancels the hold instruction 4011. By so doing, the issuance of a load request is resumed.

By the aforementioned operations, the memory access control device 200 can appropriately control the MLD (the issuance limit value) in the issuance number limitation unit 1116. By so doing, the memory access control device 200 can appropriately limit the number of load requests to be issued from the processor cores 1001 to 1004 according to the load of the memory network 2000.

Furthermore, in the aforementioned present example embodiment, as a value observed by the in-process number counter unit 1114, the number of replies, that is, the number of packets (the number of reply packets) constituting a reply is used; however, the value observed does not always need to be the number of replay packets and for example, may be the number of bytes of reply data.

For example, there is a considered case in which, when a replay packet has a width of 16 bytes, whether a reply is returned by 8 bytes×2 packets or whether a reply is returned by 16 bytes×1 packet is decided by control of a memory side (that is, determination is not possible from a core side of an issuance source). In this case, when a load request is issued, the in-process number counter unit 1114 adds "1" in 8 bytes and "2" in 16 bytes, so that a replay can be consistent in any return methods.

Furthermore, an algorithm used in determination by the MLD update determination unit 1115 is not limited to the algorithm indicated in the aforementioned present example embodiment. As the algorithm, various variations are available.

For example, in the aforementioned Formulas (3) and (4), the number of replies of a certain period is reflected in an issuance limit value (MLD) of a next period as it is; however, when a variation of the number of replies is excessively large, for example, an average of a current MLD and a MLD of a next period is calculated, so that the variation width can be narrowed.

Furthermore, although not written in the aforementioned formulas, the memory access control device 200 can also set a minimum value of the MLD, employ the setting value as the MLD of the next period when the MLD becomes less than the setting value, and provide a limitation such that performance is not lowered more than expected. Similarly, the memory access control device 200 can also set a maximum value of the MLD.

Furthermore, in the present example embodiment, when the relation of LD_CNT[t]<RY_CNT[t+T]<MLD is satisfied, that is, when replies larger than an in-process counter value are returned but the replies are not to the extent of exceeding the MLD, the MLD is not updated. In such a case, it is also devised to autonomously increase the MLD without maintaining the current state of the MLD.

Furthermore, in the memory access control device 200 of the present example embodiment, in order to understand a congestion status of the memory network 2000, a collection network for collecting operation statuses and the like of other cores is not required. The memory access control device 200 can monitor only request issuance in its own core and a reply status thereof without collecting the operation statuses of the other cores, thereby estimating the congestion status of the memory network 2000. By so doing, the memory access control device 200 can perform issuance control according to the congestion status of the memory network 2000 that frequently changes.

Furthermore, the information processing system 100 of the present example embodiment can perform timely feedback with high responsiveness according to the status of the memory network 2000 that frequently changes, so that it is possible to achieve high performance required in the HPC (High Performance Computing) field.

As described above, the information processing system 100 of the present example embodiment can autonomously and appropriately limit the number of requests to be issued to the memory network 2000 from respective cores in the multicore processor, thereby avoiding the entire memory network 2000 from entering into a congestion state.

Furthermore, the information processing system 100 of the present example embodiment does not require a function for aggregating load statuses of each core and load statuses of the memory network 2000 in order to recognize the congestion state of the memory network 2000, so that it can be achieved at a low cost.

The information processing system 100 according to the present example embodiment achieves the following effects.

That is, it is possible to achieve an effect that the occurrence of the congestion state of the memory network can be suppressed and the sufficient memory access performance can be exhibited.

The reason for this is because a next issuance limit value is outputted on the base of the in-process number, the number of replies, and a current issuance limit value, and a hold instruction of a load request is outputted to the request pipeline when the in-process number is larger than the issuance limit value.

Second Example Embodiment

Next, a second example embodiment of the present invention will be described in detail with reference to the drawings.

Figure 4:
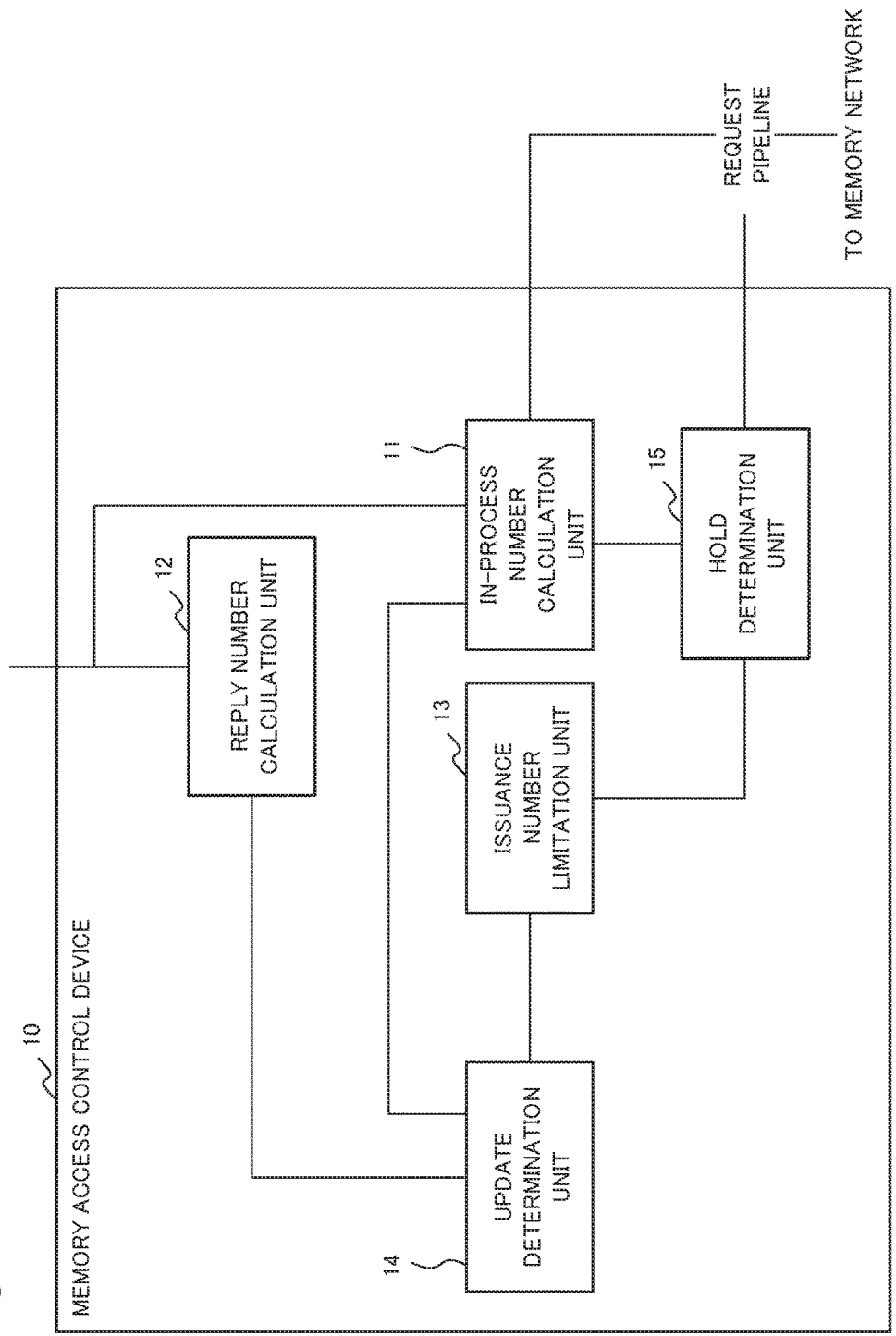
FIG. 4 is a block diagram illustrating an example of a configuration of a memory access control device 10 according to a second example embodiment.

FIG. 4 is a block diagram illustrating an example of a configuration of a memory access control device 10 according to the second example embodiment. The second example embodiment corresponds to an example of a minimum configuration regarding the memory access control device 200 of the first example embodiment.

Figure 5:
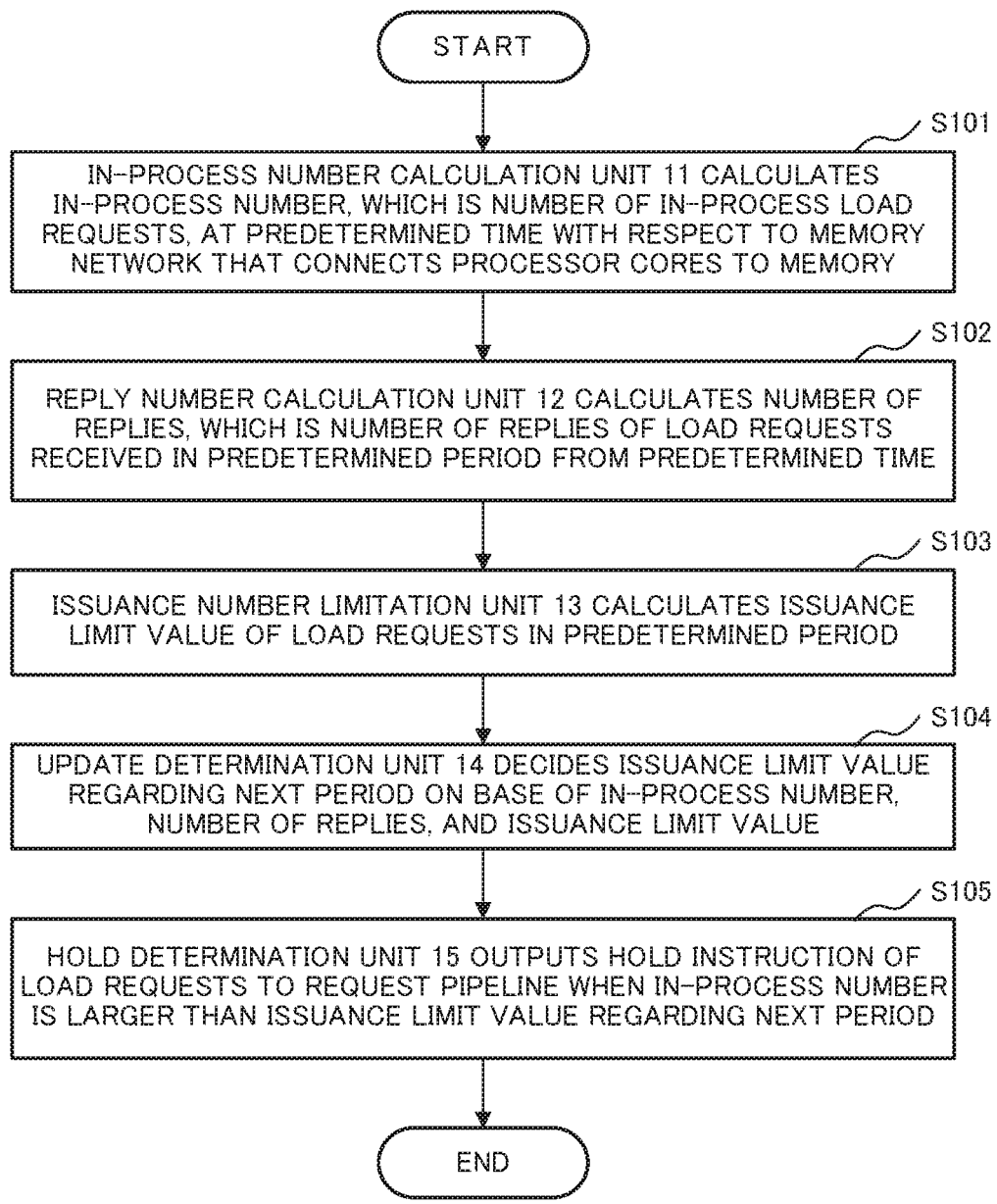
FIG. 5 is a flowchart illustrating an operation of a memory access control device 10 according to the second example embodiment.

FIG. 5 is a flowchart illustrating an operation (processing) of the memory access control device 10 according to the present example embodiment.

The memory access control device 10 includes an in-process number calculation unit 11, a reply number calculation unit 12, an issuance number limitation unit 13, an update determination unit 14, and a hold determination unit 15.

The in-process number calculation unit 11 calculates an in-process number, which is the number of in-process load requests, at a predetermined time with respect to a memory network that connects processor cores to a memory (step S101).

The reply number calculation unit 12 calculates the number of replies, which is the number of replies of the load requests received in a predetermined period from the predetermined time (step S102). In addition, the calculation also includes counting by a counter and calculation by a CPU.

The issuance number limitation unit 13 calculates an issuance limit value of the load requests in the predetermined period (step S103).

The update determination unit 14 decides the issuance limit value regarding a next period on the base of the in-process number, the number of replies, and the issuance limit value (step S104).

The hold determination unit 15 outputs a hold instruction of the load requests to a request pipeline when the in-process number is larger than the issuance limit value regarding the next period (step S105).

The memory access control device 10 according to the present example embodiment achieves the following effects.

That is, it is possible to achieve an effect that the occurrence of the congestion state of the memory network can be suppressed and the sufficient memory access performance can be exhibited.

The reason for this is because a next issuance limit value is outputted on the base of the in-process number, the number of replies, and a current issuance limit value, and a hold instruction of a load request is outputted to the request pipeline when the in-process number is larger than the issuance limit value.

[Example of Hardware Configuration]

In the aforementioned each example embodiment, each element in the memory access control devices 200 and 10 illustrated in FIG. 3 and FIG. 4 can be implemented by dedicated HW (hardware) (an electronic circuit). Furthermore, in FIG. 3 and FIG. 4, at least the following elements can be regarded as function (processing) units (software modules) of a software program.

The passage time counter unit 1111
The in-process number counter unit 1112
The reply number counter unit 1113
The in-process number counter unit 1114
The MLD update determination unit 1115
The issuance number limitation unit 1116
The hold determination unit 1117
The request pipeline 1118
The in-process number calculation unit 11
The reply number calculation unit 12
The issuance number limitation unit 13
The update determination unit 14
The hold determination unit 15

However, the division of each element illustrated in these drawings is for illustrative purposes only and actually, various configurations can be assumed.

In the present invention in which the aforementioned example embodiments have been described as examples, a computer program capable of performing the below functions is supplied to at least any one of the processor cores 1001 to 1004 illustrated in FIG. 1. The functions are functions of the aforementioned configurations in the block configuration diagrams (FIG. 3 and FIG. 4) referred to in the description of the example embodiments, or the flowchart (FIG. 5). The present invention is achieved by reading, interpreting, and executing the computer program to at least any one of the processor cores 1001 to 1004. Furthermore, it is sufficient if the computer program supplied to the device is stored in at least any one of the readable and writable external memories 3001 to 3004.

Furthermore, in the case, a method for supplying the computer program to the hardware can employ a general procedure at the present time. As the procedure, for example, there are a method for installing the computer program in a processor core via various recording media (not illustrated) such as CD-ROMs, a method for downloading the computer program from an exterior via a communication line such as the Internet, and the like. In such a case, the present invention can be regarded to be configured by codes constituting the computer program, or a recording medium storing the codes.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

Further, it is noted that the inventor's intent is to retain all equivalents of the claimed invention even when the claims are amended during prosecution.

The invention claimed is:

1. A memory access controller comprising:
a memory configured to store instructions; and
at least one processor configured to execute the instructions to:
calculate an in-process number, which is a number of in-process load requests, at a predetermined time with respect to a memory network that connects a processor core to an external memory;
calculate a number of replies, which is a number of replies of the load requests received within a predetermined period from the predetermined time;
calculate an issuance limit value of the load requests within the predetermined period;
decide the issuance limit value regarding a next period on a base of the in-process number, the number of replies, and the issuance limit value within the predetermined period; and
output a hold instruction of the load requests to a request pipeline connected to the memory network when the in-process number is larger than the issuance limit value regarding the next period.

2. The memory access controller according to claim 1, wherein, when the in-process number is larger than the number of replies, the processor calculates the number of replies as the issuance limit value regarding the next period.

3. The memory access controller according to claim 1, wherein, when the number of replies is larger than the issuance limit value within the predetermined period, the processor calculates the number of replies as the issuance limit value regarding the next period.

4. An information processing system including a processor core including a memory access controller, an external memory, and a memory network that connects the processor core to the external memory,
wherein the memory access controller comprises:
a memory configured to store instructions; and
at least one processor configured to execute the instructions to:
calculate an in-process number, which is a number of in-process load requests, at a predetermined time with respect to the memory network that connects the processor core to the external memory;
calculate a number of replies, which is a number of replies of the load requests received within a predetermined period from the predetermined time;
calculate an issuance limit value of the load requests within the predetermined period;
decide the issuance limit value regarding a next period on a base of the in-process number, the number of replies, and the issuance limit value within the predetermined period; and output a hold instruction of the load requests to a request pipeline connected to the memory network when the in-process number is larger than the issuance limit value regarding the next period.

5. A memory access control method comprising:

calculating an in-process number, which is a number of in-process load requests, at a predetermined time with respect to a memory network that connects a processor core to a memory;

calculating a number of replies, which is a number of replies of the load requests received within a predetermined period from the predetermined time;

calculating an issuance limit value of the load requests within the predetermined period;

deciding the issuance limit value regarding a next period on a base of the in-process number, the number of replies, and the issuance limit value within the predetermined period; and outputting a hold instruction of the load requests to a request pipeline connected to the memory network when the in-process number is larger than the issuance limit value regarding the next period.

6. The memory access control method according to claim 5, wherein, when the in-process number is larger than the number of replies, the number of replies is calculated as the issuance limit value regarding the next period.

7. The memory access control method according to claim 5, wherein, when the number of replies is larger than the issuance limit value within the predetermined period, the number of replies is calculated as the issuance limit value regarding the next period.

8. A non-transitory computer-readable recording medium storing a program causing a processor core to perform:

a process of calculating an in-process number, which is a number of in-process load requests, at a predetermined time with respect to a memory network that connects the processor core to a memory;

a process of calculating a number of replies, which is a number of replies of load requests received within a predetermined period from the predetermined time;

a process of calculating an issuance limit value of the load requests within the predetermined period;

a process of deciding the issuance limit value regarding a next period on a base of the in-process number, the number of replies, and the issuance limit value within the predetermined period; and a process of outputting a hold instruction of the load requests to a request pipeline connected to the memory network when the in-process number is larger than the issuance limit value regarding the next period.

9. The non-transitory computer-readable recording medium storing the program according to claim 8, wherein, when the in-process number is larger than the number of replies, a process of calculating the number of replies as the issuance limit value regarding the next period is caused to be performed by the processor core.

10. The non-transitory computer-readable recording medium storing the program according to claim 8, wherein, when the number of replies is larger than the issuance limit value within the predetermined period, a process of calculating the number of replies as the issuance limit value regarding the next period is caused to be performed by the processor core.

* * * * *